Figure 1:
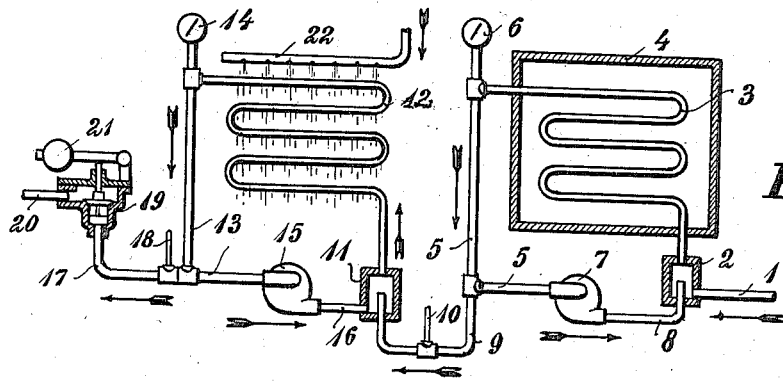

UNITED STATES PATENT OFFICE.

NIELS JONAS NIELSEN, OF AARHUS, DENMARK.

METHOD AND MEANS FOR THE TREATMENT OF FLUIDS CONTAINING FAT GLOBULES, CASEIN, AND SUGAR.

1,168,823.   Specification of Letters Patent.   Patented Jan. 18, 1916.

Application filed February 27, 1914. Serial No. 821,462.

*To all whom it may concern:*

Be it known that I, NIELS JONAS NIELSEN, subject of the Kingdom of Denmark, residing at No. 15 Frederiksgade, Aarhus, Denmark, have invented certain new and useful Improvements in Methods and Means for the Treatment of Fluids Containing Fat Globules, Casein, and Sugar, of which the following is a specification.

My invention consists of a method for the treatment of milk, cream and similar fluids containing fat globules, casein and lactine and of the means necessary for the application of the treatment.

By the application of the method a double advantage is obtained, viz. a complete sterilization of the fluid as all living organisms are killed, and further a certain, more or less considerable change of consistency of the fluid which is obtained thereby that the state of the fat globules and the lactine is changed during the treatment.

By the already known methods of sterilizing fluids containing fat globules and casein is found the drawback that the state of the fat globules and the lactine cannot be predetermined during and after the treatment, as the fat globules, if they are heated under pressure to 110° C. and thereafter exposed to a considerably lower pressure, will burst, while the lactine when heated to a temperature of about 128° C. will change its state and bring about a coloring and a disagreeable taste of the fluid.

By the present invention one is able completely to control the state of the fat globules and the lactine during and after the treatment partly by maintaining a fixed relation between the pressures of the fluid during the heating and cooling process and a fixed relation between the temperature before the cooling and the pressure under which the latter takes place, partly by cooling the fluid during the heating process a great number of times with short intervals and by heating it during the cooling process in a similar manner.

In the drawing are illustrated the means for carrying out the method in question.

Figure 2:
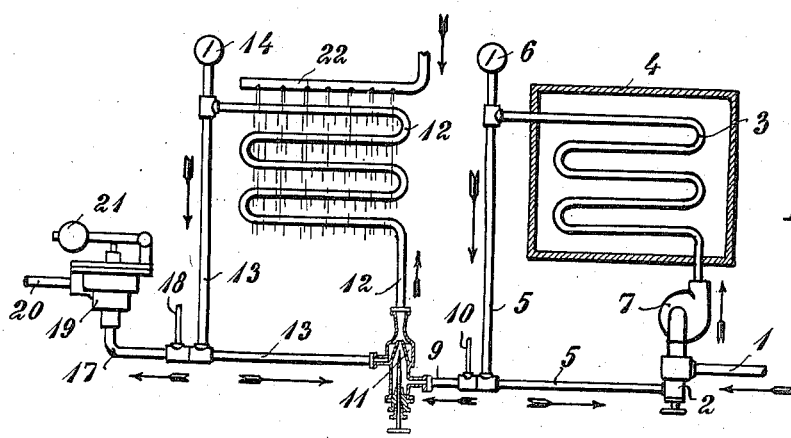
Figure 3:
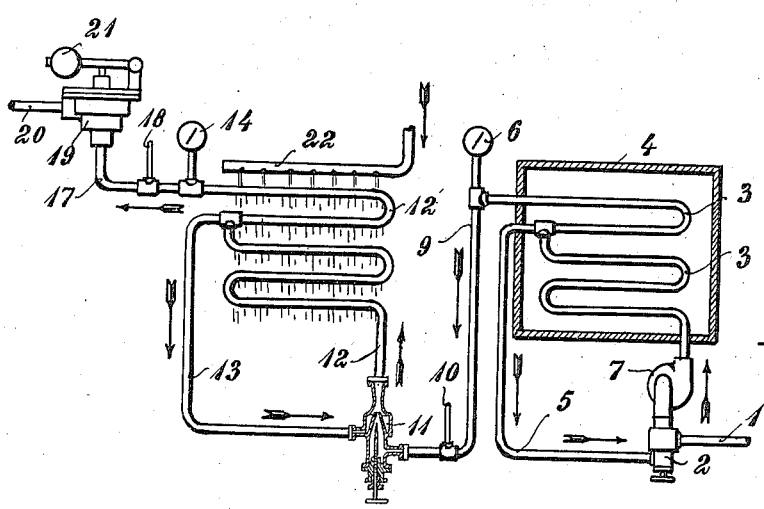

Figure 1 shows an apparatus having the same pressure in the heater and the cooler. Fig. 2 shows an apparatus having the same or different pressures in the heater and cooler. Fig. 3 shows an apparatus as in Fig. 2 but with modifications respecting heating and cooling.

The apparatus shown in Fig. 1 consists of a pipe 1 leading from a forcing-pump or an elevated reservoir to a chamber 2. From this chamber a spiral tube 3 which is arranged in a closed reservoir 4 containing heated water or steam leads a pipe 5 having a pressure gage 6 and being connected with a circulation pump 7, the latter being by means of a pipe 8 connected with the chamber 2. From the pipe 5 another pipe 9 having a thermometer 10 leads to a mixing chamber 11, the latter being connected with pipe 13 by means of a spiral tube 12, tube 12 being irrigated by water from pipe 22 and the pipe 13 having a pressure gage 14. The pipe 13 leads to a circulating pump 15 which by means of a pipe 16 is connected with the mixing chamber 11. From the pipe 13 a pipe 17 having a thermometer 18 leads to a control-valve 19 with a spring or weight 21 and provided with a pipe 20.

The above described apparatus works in the following manner: The valve 19 is loaded so that a certain pressure of the fluid in the spiral tube 12 may be obtained, the said pressure—dependent upon the resistance in the pipes and the capacity of the pumps 7 and 11—standing in a definite relation to the pressure in the spiral tube 3, but being always lower than this. The fluid which is to be treated is led in cold state through the pipe 1 into the chamber 2 and from here farther through the spiral tube 3, in which it is heated, to the pipe 5. From here a part of the fluid passes through the pipe 9 to the chamber 11, while another part passes through the pipe 5 to the pump 7, which forces the fluid through the pipe 8 into the chamber 2. The heated fluid will here meet the cold fluid coming from the pipe 1 and mix with it. The hot fluid will thereby be suddenly cooled and the cold fluid be suddenly heated. The fluid thereafter passes on to the heater 3. A quantity of fluid is thus continually supplied through the pipe 1 and a similar quantity of fluid passes through the pipe 9. At the same time a considerably bigger quantity of fluid is circulating through the heater 3 and the pump 7, the fluid being for every circulation heated in the heater 3 and cooled in the cooling chamber 2. The heated fluid led to the chamber 11 is forced from here through the spiral tube 12 which is irrigated with cold water supplied through pipe 22 or kept cooled by other means. The spiral tube 12 leads to the pipe 13 and through the latter the fluid passes one part to the pipe 17 and another part to the pump 15 the latter being by means of the pipe 16 connected with the chamber 11. Here a similar process takes place as in the heater, the cold fluid from the pipe 16 being mixed in the chamber 11 with the hot fluid from the pipe 9, the cold fluid being thereby suddenly heated and the hot fluid suddenly cooled. The fluid passes then through the pipe 17 to the valve 19 and from here through the pipe 20 to a reservoir. In the chamber 2 the hot fluid coming from the tube 5 will mix with the cold fluid supplied from the tube 9, thereby a sudden heating of the cold fluid and a corresponding cooling of the hot fluid. In the chamber 11 the cold fluid supplied from the tube 13 will in a similar manner mix with the hot fluid supplied from the tube 9, so that the cold fluid is suddenly heated and the hot fluid suddenly cooled. This is of the greatest importance both to the sterilization of the fluid and to the consistency of the substances contained in the fluid.

The apparatus shown in Fig. 2 is made with some modifications, the mixing chambers 2 and 11 being made as injectors with means for adjusting a movable piece at the end of the pipe 9 so as to vary the injector effect. By this arrangement the pump 15 may in certain cases be omitted, and the difference of pressure between the fluid in the heater and in the cooler may be kept greater. These differences in pressure and temperature are important since they cause the more or less complete bursting of the fat globules, it being desirable for the subsequent employment of the fluid for certain purposes that the fat globules shall be bursted.

In Fig. 3 the apparatus is built as in Fig. 2 but with an alteration of the heating tube 3 and the cooling tube 12, in this figure the circulating pipes 5 and 13 issue from the spiral tubes 3' and 12' in such a manner that the latter are elongated a certain distance before they are connected with the pipes 9 and 17.

Having now particularly described and ascertained the nature of my said invention I declare that what I claim is:

1. The method of treating liquids containing fat globules, casein and lactine, consisting in circulating two bodies of the liquid in closed circuits maintaining the pressure and temperature of the liquid in one of said circuits above the pressure and temperature in the other of said circuits, introducing said liquid into said circuit having the higher temperature, leading liquid from said last mentioned circuit into said cooler circuit, and discharging liquid from said cooler circuit, the circulation in said two circuits being maintained at high speed, and the relative pressures and temperatures being such that the fat globules will be bursted.

2. An apparatus for treating liquids containing fat globules, casein and lactine, comprising in combination two closed circuits for the liquid, means for circulating the liquid in said circuits, means for heating one circuit and cooling the other circuit, means for leading liquid into the heated circuit, means for leading liquid from the heated circuit to the colder circuit, means for discharging liquid from said colder circuit, and means for intimately mixing the liquid in said circuits with the liquid introduced thereinto.

In witness whereof I have hereunto set my hand.

NIELS JONAS NIELSEN.